US010429731B2

(12) United States Patent
Schmidt et al.

(10) Patent No.: US 10,429,731 B2
(45) Date of Patent: Oct. 1, 2019

(54) METHOD AND DEVICE FOR GENERATING A REFERENCE IMAGE IN THE CHARACTERIZATION OF A MASK FOR MICROLITHOGRAPHY

(71) Applicant: Carl Zeiss SMT GmbH, Oberkochen (DE)

(72) Inventors: Carsten Schmidt, Jena (DE); Michael Himmelhaus, Berlin (DE)

(73) Assignee: Carl Zeiss SMT GmbH, Oberkochen (DE)

( * ) Notice: Subject to any disclaimer, the term of this patent is extended or adjusted under 35 U.S.C. 154(b) by 48 days.

(21) Appl. No.: 15/807,930

(22) Filed: Nov. 9, 2017

(65) Prior Publication Data
US 2018/0129131 A1 May 10, 2018

(30) Foreign Application Priority Data
Nov. 9, 2016 (DE) .......................... 10 2016 013 260

(51) Int. Cl.
G06F 17/50 (2006.01)
G03F 1/70 (2012.01)
(Continued)

(52) U.S. Cl.
CPC .................. G03F 1/70 (2013.01); G03F 1/84 (2013.01); G03F 7/705 (2013.01);
(Continued)

(58) Field of Classification Search
USPC ......................................................... 716/53
See application file for complete search history.

(56) References Cited

U.S. PATENT DOCUMENTS 7,703,069 B1 * 4/2010 Liu .......................... G03F 1/144
716/50
RE44,792 E 3/2014 Konstantinos
(Continued)

FOREIGN PATENT DOCUMENTS

CN 102057329 5/2011 .............. G03F 7/20
DE 102005036892 2/2007 ............. G06F 17/50
(Continued)

OTHER PUBLICATIONS

German Office Action for German Application No. 10 2016 013 260.4 dated May 29, 2017 with English Translation.
(Continued)

*Primary Examiner* — Mohammed Alam
(74) *Attorney, Agent, or Firm* — Fish & Richardson P.C.

(57) ABSTRACT

The invention relates to a method and a device for generating a reference image in the characterization of a mask for microlithography, wherein the mask comprises a plurality of structures and wherein the reference image is generated by simulation of the imaging of said mask, said imaging being effected by a given optical system, both using a rigorous simulation and using a Kirchhoff simulation, wherein the method comprises the following steps: assigning each structure of said plurality of structures either to a first category or to a second category, calculating a plurality of first partial spectra for structures of the first category with implementation of rigorous simulations, calculating a second partial spectrum for structures of the second category with implementation of a Kirchhoff simulation, generating a hybrid spectrum on the basis of the first partial spectra and the second partial spectrum, and generating the reference image with implementation of an optical forward propagation of said hybrid spectrum in the optical system.

20 Claims, 3 Drawing Sheets

(51) Int. Cl.
*G03F 7/20* (2006.01)
*G03F 1/84* (2012.01)

(52) U.S. Cl.
CPC ...... *G06F 17/5018* (2013.01); *G06F 17/5081* (2013.01); *G06F 2217/08* (2013.01)

(56) References Cited

U.S. PATENT DOCUMENTS

| | | | |
|---|---|---|---|
| 8,649,929 | B2 | 4/2014 | Seidel et al. |
| 8,694,929 | B2 | 4/2014 | Seidel et al. |
| 8,918,743 | B1 | 12/2014 | Yan et al. |
| 2004/0122636 | A1 | 6/2004 | Adam |
| 2007/0213962 | A1 | 9/2007 | Kostantinos |
| 2009/0300573 | A1 | 12/2009 | Cao et al. |
| 2010/0162199 | A1* | 6/2010 | Liu .................... G03F 1/144 716/54 |
| 2012/0075456 | A1* | 3/2012 | Seitz .................... G01B 11/02 348/79 |
| 2013/0019212 | A1 | 1/2013 | Seidel et al. |
| 2013/0139118 | A1* | 5/2013 | Liu .................... G03F 1/144 716/53 |
| 2015/0324963 | A1 | 11/2015 | Sezginer et al. |
| 2018/0129131 | A1* | 5/2018 | Schmidt .................... G03F 1/70 |

FOREIGN PATENT DOCUMENTS

| | | | |
|---|---|---|---|
| DE | 102011078999 | 1/2013 | ............... G03F 9/00 |
| TW | 201602717 | 1/2016 | ............... G03F 1/84 |

OTHER PUBLICATIONS

Adam et al., "Methodology for Accurate and Rapid Simulation of Large Arbitrary 2D Layouts of Advanced Photomasks", *Proceedings of SPIE*, vol. 4562, pp. 1051-1067 (2002).

Office Action from the Taiwan Patent Office for Taiwanese Application No. 106138646 dated Jun. 20, 2018.

* cited by examiner

METHOD AND DEVICE FOR GENERATING A REFERENCE IMAGE IN THE CHARACTERIZATION OF A MASK FOR MICROLITHOGRAPHY

CROSS-REFERENCE TO RELATED APPLICATION

This application claims priority of German Patent Application DE 10 2016 013 260.4 filed on Nov. 9, 2016. The content of this application is hereby incorporated by reference in its entirety.

TECHNICAL FIELD

The invention relates to a method and a device for generating a reference image in the characterization of a mask for microlithography.

BACKGROUND

Microlithography is used for producing microstructured components such as, for example, integrated circuits or LCDs. The microlithography process is carried out in what is called a projection exposure apparatus, which comprises an illumination device and a projection lens. The image of a mask (=reticle) illuminated by way of the illumination device is in this case projected by way of the projection lens onto a substrate (e.g. a silicon wafer) coated with a light-sensitive layer (photoresist) and arranged in the image plane of the projection lens, in order to transfer the mask structure to the light-sensitive coating of the substrate.

In the lithography process, undesired defects on the mask have a particularly disadvantageous effect since they can be reproduced with every exposure step. In this case, undesired defect should be understood to mean any deviation of the mask structure from the ideal design that leads to the structure being transferred to the wafer in a manner deviating from the targeted manner. In order to minimize the mask defects and in order to realize a successful mask repair, a direct and fast analysis of the imaging effect of possible defect positions is thus desirable.

For such ascertainment of defects and also in further applications for characterizing the structures on the mask both with regard to existing deviations of the respective structure from the targeted position predefined in each case by the design (so called positioning error or "registration error", known as: "Registration") and with regard to the linewidth of the structures (CD="critical dimension"), in the art methods are known in which a reference image used for the respective characterization (e.g. for defect inspection or position determination) is generated by simulation.

In this case, it is known, in particular, to implement said simulation as rigorous simulation. Such a rigorous electromagnetic simulation involves describing the interaction of the light field with the mask whilst taking account of the three-dimensionality of the mask and also the dielectric properties thereof and the electromagnetic interface conditions prevailing at the respective surface, wherein the three-dimensional geometry and also the concrete layer structure of the mask are taken into account. Furthermore, polarization effects (describable by Jones matrices) of the mask and also of the optical imaging in the optical system (e.g. the position measuring device) are also taken into account. Implementing rigorous simulations has the advantage of a significantly higher accuracy in comparison for instance with so-called Kirchhoff simulation (=scalar approximation), in which all effects associated with the three-dimensionality of the mask are disregarded and which becomes increasingly faulty in particular for structures of the order of magnitude of the optical wavelength or in the case of polarization effects.

One problem that occurs here in practice, however, is that as the complexity of the masks used in microlithography increases, the implementation of rigorous simulations over the entire mask or for all of the mask structures situated thereon leads to expenditure of time and computational complexity that are no longer tenable. In this case, inter alia, so called auxiliary structures having structure sizes below the resolution limit of the respective optical system also contribute to the complexity of the mask, and although they are not themselves imaged onto the wafer in the lithography process, they are required in order to realize a desired imaging of the mask structures onto the wafer (e.g. in order to reduce so called "optical proximity" effects).

On the other hand, however, a transition to approximative methods for the purpose of limiting the expenditure of time and computational complexity during reference image generation necessarily leads to correspondingly great inaccuracies and hence a possibly erroneous characterization of the mask.

With regard to the prior art, merely by way of example, reference is made to U.S. Pat. No. 8,918,743, B1, US 2004/0122636 A1 and DE 10 2011 078 999 A1.

SUMMARY

Against the above background, in a general aspect, the present invention provides a method and a device for generating a reference image in the characterization of a mask for microlithography which enables a characterization that is as accurate as possible with tenable expenditure of time and computational complexity.

In a method according to the invention for generating a reference image in the characterization of a mask for microlithography, wherein the mask comprises a plurality of structures and wherein the reference image is generated by simulation of the imaging of said mask, said imaging being effected by a given optical system, both using a rigorous simulation and using a Kirchhoff simulation, the method comprises the following steps:

assigning each structure of said plurality of structures either to a first category or to a second category, calculating a plurality of first partial spectra for structures of the first category with implementation of rigorous simulations, calculating a second partial spectrum for structures of the second category with implementation of a Kirchhoff simulation, generating a hybrid spectrum on the basis of the first partial spectra and the second partial spectrum, and generating the reference image with implementation of an optical forward propagation of said hybrid spectrum in the optical system.

The invention is based on the concept, in particular, of realizing the generation of a reference image with sufficient accuracy in conjunction with tenable expenditure of time and computational complexity by virtue of the fact that the entire mask is not rigorously simulated nor is it completely simulated in a manner approximated by a Kirchhoff simulation, rather both approaches are suitably combined with one another. According to the invention, in this case a hybrid spectrum is generated, which is based both on first partial spectra calculated with implementation of rigorous simulations and on a second partial spectrum calculated with implementation of a Kirchhoff simulation.

In this case, the invention is based on the consideration that the rigorous calculation can be carried out particularly efficiently for specific structures, including in particular the abovementioned auxiliary structures that are comparatively small or have dimensions below the resolution limit, whether on account of the comparatively simple geometry of said auxiliary structures or on account of their repeated occurrence within the mask (with the consequence that once rigorous simulations have been calculated, they can be used without renewed calculation upon the occurrence of the same structure elsewhere). In addition, once spectra have been calculated, by use of scaling they can also be used once again for structures deviating moderately in terms of their absolute size.

In other words, the invention makes use of the circumstance that precisely the auxiliary structures that are comparatively prone to errors in an approximative Kirchhoff method are particularly suitable for the rigorous simulation approach.

In accordance with one embodiment, partial spectra calculated for structures of the first category with implementation of rigorous simulations are retrieved from a database generated beforehand.

Furthermore, the approach according to the invention is also based on the inventors' insight that the approximative Kirchhoff method, in the case of a suitable configuration of the method of reference image generation, which configuration will be described in even greater detail below, can indeed still be used to a significant extent, namely by virtue of specific parameters (which, as will be described in even greater detail below, can be mask parameters, system parameters of the optical system and/or illumination parameters) being suitably adapted in an iterative (optimization) process with the consequence that, despite application of the approximative Kirchhoff method, a sufficient accuracy in the reference image generation can still be achieved or, depending on the application, a good correspondence between simulated reference image and measurement image can be achieved.

In accordance with one embodiment, therefore, the step of generating the reference image is carried out repeatedly in an iterative process, wherein mask parameters, system parameters of the optical system and/or illumination parameters taken as a basis for the simulation are varied during this iteration.

In accordance with one embodiment, during said iteration the mask properties to be determined in the characterization of the mask, in particular possible defect positions, remain excluded from a variation. This takes account of the circumstance that a "release" also of the mask properties ultimately to be determined (such as e.g. possible defect positions) in the course of the variation of mask properties that is carried out in the context of the iteration described above would have the effect that these mask properties to be determined would ultimately be altered or possibly (for instance in the case of defects present) eliminated, which would in turn result in an erroneous characterization.

In accordance with one embodiment, before generating a hybrid spectrum on the basis of the first partial spectra and the second partial spectrum the spectral resolution of the first partial spectra is increased. This takes account of the circumstance that the partial spectra generated during the rigorous simulations according to the invention on comparatively small image fields differ significantly from the calculated Kirchhoff spectrum with regard to the spectral resolution in the frequency domain with the consequence that a simple addition would be beset by errors and a "refinement" of the coarse pattern respectively generated with the rigorous simulations is thus firstly necessary before the calculation of the hybrid spectrum.

The invention further relates to a device for generating a reference image in the characterization of a mask for microlithography, which is configured to carry out a method having the features described above. With regard to advantages and preferred configurations of the device, reference is made to the above explanations in association with the method according to the invention.

Further configurations of the invention can be gathered from the description and the dependent claims.

The invention is explained in greater detail below on the basis of exemplary embodiments illustrated in the accompanying figures.

DETAILED DESCRIPTION

The sequence of a method according to the invention is explained below on the basis of a preferred embodiment with reference to the flow diagram shown in FIG. 1.

In accordance with FIG. 1, for a predefined mask design 105, or the structures ("individual objects") situated thereon, a subdivision is carried out into structures of a first category, for which rigorous simulations are in each case implemented subsequently, and structures of a second category, for which a Kirchhoff simulation is implemented.

In this case, in embodiments of the invention, in particular auxiliary structures (having a structure size below the resolution limit of the optical system) typically present on the mask are assigned to the first category. This firstly takes account of the circumstance that the approximative Kirchhoff approach is comparatively prone to errors in the case of these auxiliary structures, and secondly exploits the fact that said auxiliary structures, on account of their typically relatively simple geometry and their possibly repeated occurrence, are particularly suitable for a decomposition in the sense of a rigorous calculation of individual partial spectra. The rigorous simulations can be implemented for example using the finite element method (FEM) or the finite difference method in the time domain (FDTD="Finite Difference Time Domain").

In embodiments of the invention, even for a multiplicity of structures or individual objects (e.g. typical and frequently used auxiliary structures) the respective spectra calculated by rigorous simulation can be stored in a database or library and retrieved as necessary.

During the corresponding calculation of the rigorous partial spectra (in block 120), the mask parameters (e.g. permittivity, layer thickness and sidewall angle) are taken into account in a manner known per se. Furthermore, in the case of (auxiliary) structures lying close together, in particular at distances in the range of 1-5 wavelengths, it is also possible to implement a common rigorous simulation of a plurality of (auxiliary) structures for correctly taking account of the interaction taking place between them.

Figure 1:
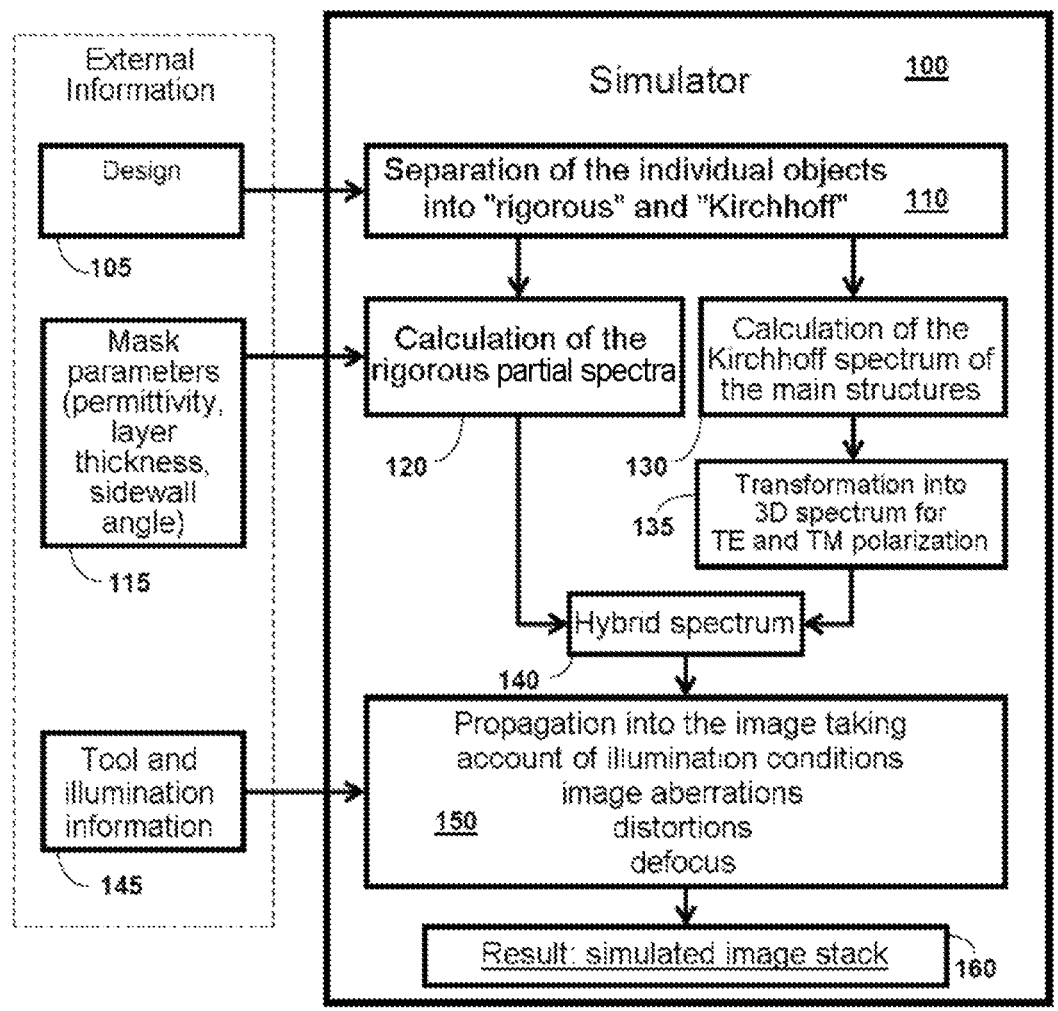
FIG. 1 shows a schematic illustration for elucidating a method according to the invention for generating a reference image in one embodiment.

The structures assigned to the second category (which typically include the used structures on the mask) are subjected to the approximative calculation of the Kirchhoff spectrum in function block 130 in accordance with FIG. 1. In this case, in a manner known per se, all effects associated with the 3-dimensionality of the mask are disregarded, such that a transformation of the calculated Kirchhoff spectrum into a 3-dimensional spectrum for TE and TM polarization (block 135) is firstly carried out before a calculation of a hybrid spectrum according to the invention (block 140).

The hybrid spectrum is then generated by summation of the individual spectra taking account of the position of the rigorously calculated structures in the overall structure.

Afterwards, in accordance with FIG. 1, from the hybrid spectrum 140 the reference image of the mask is generated with implementation of an optical forward propagation of said hybrid spectrum (block 150) taking account of the existing information about the relevant optical system ("tool and illumination information," block 145) for which the imaging of the mask is intended to be simulated or with which the measurement image to be compared is generated. In this case, in particular the illumination conditions, image aberrations, distortions and defocus can be taken into account in this forward propagation.

It should be taken into consideration that in practice for the correct combination of the rigorous partial spectra calculated in block 120 with the Kirchhoff spectrum calculated in block 130 generally the spectral resolution of the rigorous partial spectra in the frequency domain must be increased in order to adapt said rigorous partial spectra to the Kirchhoff spectrum by a "refinement." This takes account of the circumstance that the rigorous simulation according to the invention is applied to comparatively smaller image fields with the consequence that a coarser grid arises in the frequency spectrum, which coarser grid has to be adapted to the grid of the Kirchhoff spectrum before an addition by use of the refinement described above.

Figure 2:
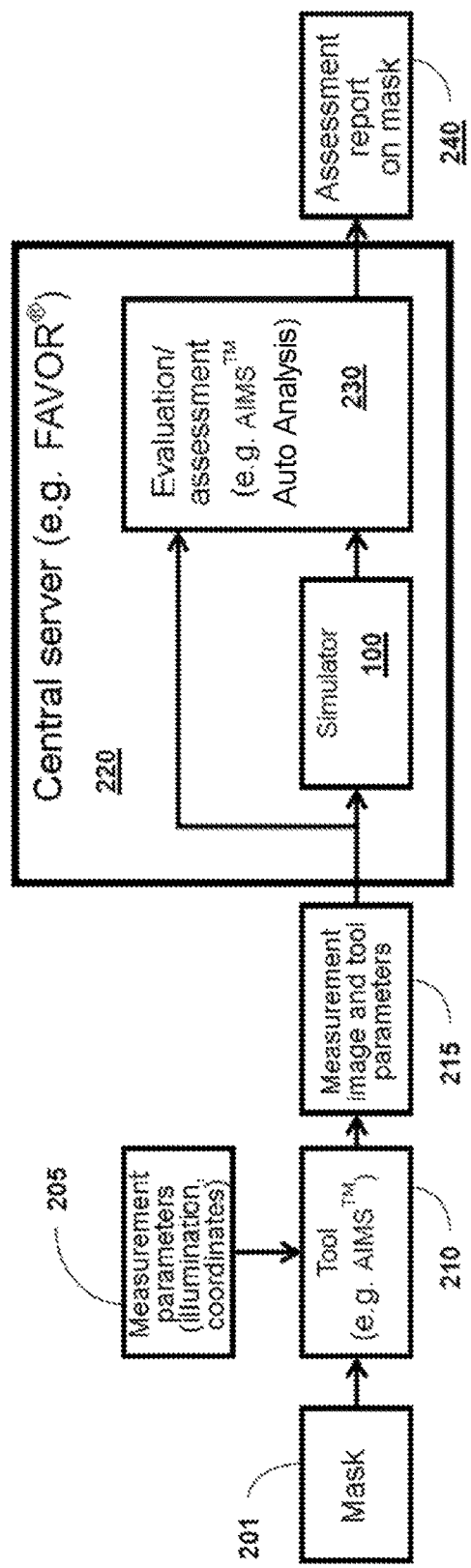
FIG. 2 shows a schematic illustration for elucidating the possible integration of the generation of a reference image according to the invention into an automated process in the characterization of a mask for microlithography.

FIG. 2 shows a schematic diagram for elucidating the possible integration of the method according to the invention into an automated process for inspection or assessment of a mask for microlithography. In this case, an optical system designed for recording a measurement image is designated by "210." For example, the optical system can include an Aerial Image Measurement System (AIMS™), available from Carl Zeiss SMT, Jena, Germany. The optical system generates a measurement image for a given mask 201 depending on predefined measurement parameters 205 (e.g. illumination parameters). Said measurement image, just like the parameters of the relevant optical system (block 215), is fed to a central server 220 containing both the simulation device 100 described above with reference to FIG. 1 and an evaluation unit 230. For example, the central server 220 can include a FAVOR® Computation Engine System available from Carl Zeiss SMT. For example, the evaluation unit 230 can be implemented based on AIMS™ AutoAnalysis software, available from Carl Zeiss SMT.

The simulation device 100 generates a reference image, as described above with reference to FIG. 1, on the basis of which reference image possible defect sites are identified in the difference image (between reference image and measurement image) in the evaluation unit 230. The evaluation unit 230 supplies as a result a corresponding assessment report on the mask 201. The realization of the simulation device 100 and the evaluation unit 230 in a separate system or server has the advantage that the reference image generation according to the invention can be separated from the actual measurement process both spatially and from a temporal standpoint (e.g. with realization of post processing).

Figure 3:
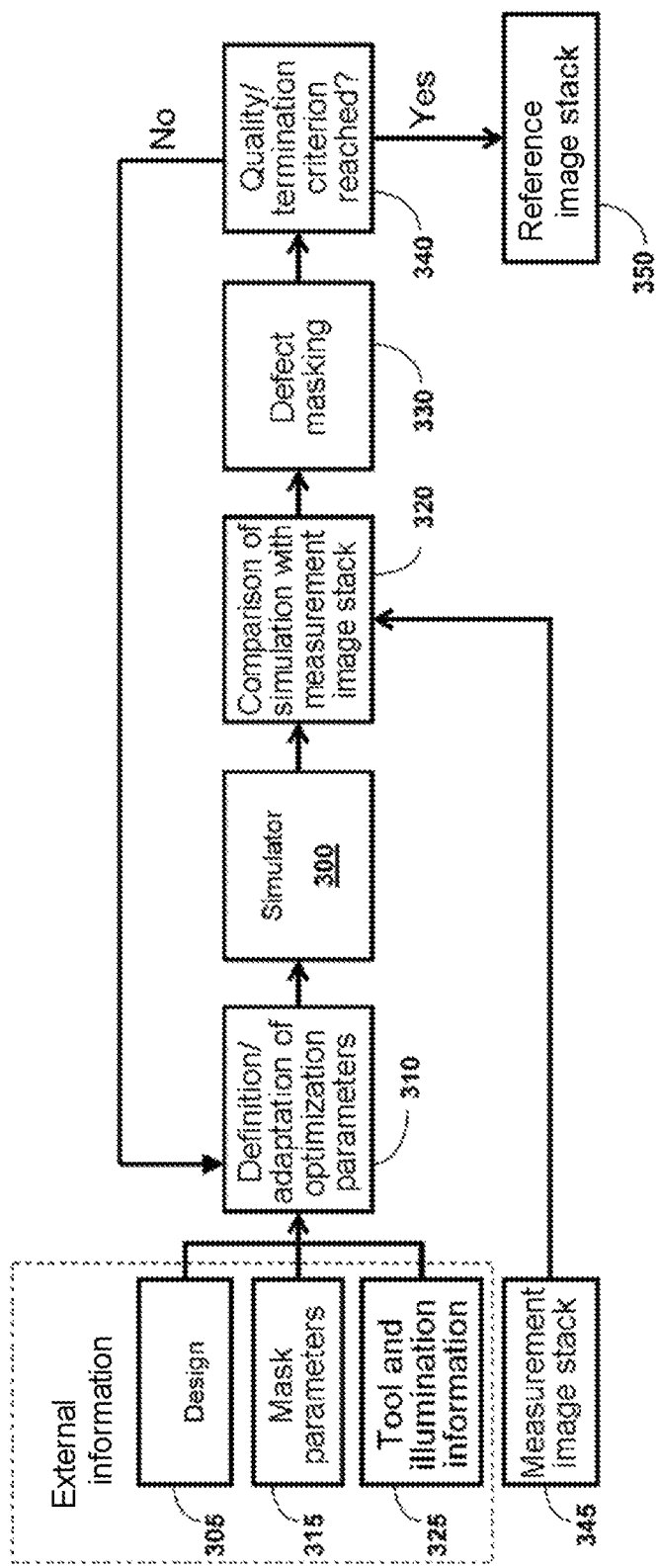
FIG. 3 shows a schematic illustration for elucidating a further embodiment of the method according to the invention.

FIG. 3 shows a diagram for elucidating one advantageous development of the method described with reference to FIG. 1 to the effect that the reference image generated is optimized or adapted better to the actually generated measurement image in an iterative process with variation of parameters respectively taken as a basis for the simulation.

The corresponding parameters ("optimization parameters") that are varied during said iterative process can be, e.g., design parameters 305, mask parameters 315 or system parameters of the optical system ("tool and illumination information") 325, the corresponding definition of the parameters to be varied being effected in block 310 in accordance with FIG. 3. The parameters that are varied during said iterative process can also be scaling factors with which the absolute size of spectra, once they have been rigorously calculated, is adapted by scaling.

The simulation device 300 in accordance with FIG. 3 corresponds to the simulation device 100 from FIG. 1. The reference image respectively generated is compared with the measurement image 345 in block 320.

In block 320 ("defect masking") the mask properties ultimately to be determined in the characterization of the mask (e.g. possible defect positions) are excluded from, or "left out of," the image comparison described above, this being intended to prevent the structures obtained in the reference image from being altered undesirably or in a manner that corrupts the result of the characterization (e.g. the defects to be detected disappear during the iterative optimization process). If the mask properties to be determined in the characterization of the mask are e.g. linewidths or positions of specific structures, it should be taken into consideration that, in the case of the iterative optimization carried out in accordance with FIG. 3, although the respective structures are better adapted to the actual measurement image in terms of their geometry or symmetry, e.g. the position of the relevant structure itself remains unchanged.

In accordance with FIG. 3, block 340 then involves the interrogation of whether a predefined quality or termination criterion has been attained or the reference image generated corresponds to the measurement image well enough. If this is the case, the corresponding reference image 350 is output, otherwise a renewed simulation is implemented with renewed adaptation of the optimization parameters (corresponding to the return to block 310). In order to calculate the deviation between reference image and measurement image, depending on the application it is possible to use e.g. the average intensity deviation, the pixel by pixel intensity deviation, the sum of the pixel by pixel intensity deviations, the deviation of the image gradients or the deviation of the dimensions or linewidths of the structures present in the image. Furthermore, depending on the application, it is also possible to use only specific image regions in the calculation of the deviation between reference image and measurement image or to omit individual image regions in this case.

As a result, the iterative optimization process described above with reference to FIG. 3 achieves a better adaptation of the respective structures in the reference image generated by simulation to the actual measurement image in terms of its geometry or symmetry. This in turn has the consequence that the approximative Kirchhoff simulation, likewise used in the context of the simulations according to the invention, can still be used within a relatively wide scope and a sufficient accuracy can nevertheless be achieved in the characterization.

Furthermore, in the course of the iterative optimization process, values of parameters whose deviation from the respective original value systematically varies can be used as future starting values for a future optimization, whereas values of parameters which, in the course of the iterative optimization process, exhibit a substantially constant deviation from the respective original values can be predefined in future simulations without optimization. It is thereby possible to achieve a further reduction of the computation time required for generating the reference image with at the same time high simulation quality.

In some implementations, instructions for carrying out the computations described above, e.g., calculation of the rigorous partial spectra (120), calculation of the Kirchhoff spectrum of the main structures (130), transformation into 3-dimension spectrum for TE and TM polarization (135), and calculation of a hybrid spectrum (140) can be stored in a computer-readable medium. The instructions when executed by a computer (e.g., the central server 220) can cause the computer to perform the computations described above. In some implementations, the computer (e.g., central server 220) can include one or more data processors and one or more computer-readable media (e.g., RAM, ROM, SDRAM, hard disk, optical disk, and flash memory). The one or more processors can perform various calculations and processing of the signals described above. The calculations and processing of signals can also be implemented using application-specific integrated circuits (ASICs). The term "computer-readable medium" refers to a medium that participates in providing instructions to a processor for execution, including without limitation, non-volatile media (e.g., optical or magnetic disks), and volatile media (e.g., memory) and transmission media. Transmission media includes, without limitation, coaxial cables, copper wire, fiber optics and free space. The memory can include any type of memory, such as RAM, ROM, SDRAM, and flash memory.

The features described above can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., C, Java, Python), including compiled or interpreted languages, and it can be deployed in any form, including as a stand-alone program or as a module, component, subroutine, a browser-based web application, or other unit suitable for use in a computing environment.

Suitable processors for the execution of a program of instructions include, e.g., general purpose microprocessors, special purpose microprocessors, digital signal processors, single-core or multi-core processors, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM, DVD-ROM, and Blu-ray BD-ROM disks. The processor and the memory can be supplemented by, or incorporated in, ASICs (application-specific integrated circuits).

Even though the invention has been described on the basis of specific embodiments, numerous variations and alternative embodiments are apparent to a person skilled in the art, for example by combination and/or exchange of features of individual embodiments. Accordingly, it goes without saying for a person skilled in the art that such variations and alternative embodiments are concomitantly encompassed by the present invention, and the scope of the invention is restricted only within the meaning of the accompanying claims and the equivalents thereof.

What is claimed is:

1. A method for generating a reference image in the characterization of a mask for microlithography, wherein the mask comprises a plurality of structures and wherein the reference image is generated by simulation of the imaging of said mask, said imaging being effected by a given optical system, both using a rigorous electromagnetic simulation and using a Kirchhoff simulation, wherein the method comprises the following steps:
    a) assigning each structure of said plurality of structures either to a first category or to a second category;
    b) calculating, using one or more data processors, a plurality of first partial spectra for structures of the first category with implementation of rigorous electromagnetic simulations;
    c) calculating, using the one or more data processors, a second partial spectrum for structures of the second category with implementation of a Kirchhoff simulation;
    d) generating, using the one or more data processors, a hybrid spectrum on the basis of the first partial spectra and the second partial spectrum; and
    e) generating, using the one or more data processors, the reference image with implementation of an optical forward propagation of said hybrid spectrum in the optical system.

2. The method according to claim 1, in which the structures assigned to the first category in step a) comprise auxiliary structures having a structure size below the resolution limit of the optical system.

3. The method according to claim 2, in which the structures assigned to the second category in step a) comprise used structures that are intended for imaging onto a wafer in a microlithographic exposure process.

4. The method according to claim 2, in which partial spectra calculated for structures of the first category with implementation of rigorous electromagnetic simulations are retrieved from a database generated beforehand.

5. The method according to claim 2, in which step e) of generating the reference image is carried out repeatedly in an iterative process, wherein mask parameters, system parameters of the optical system and/or illumination parameters taken as a basis for the simulation are varied during this iteration.

6. The method according to claim 2, in which before generating a hybrid spectrum on the basis of the first partial spectra and the second partial spectrum in step d) the spectral resolution of the first partial spectra is increased.

7. The method according to claim 1, in which the structures assigned to the second category in step a) comprise used structures that are intended for imaging onto a wafer in a microlithographic exposure process.

8. The method according to claim 1, in which partial spectra calculated for structures of the first category with implementation of rigorous electromagnetic simulations are retrieved from a database generated beforehand.

9. The method according to claim 1, in which step e) of generating the reference image is carried out repeatedly in an iterative process, wherein mask parameters, system parameters of the optical system and/or illumination parameters taken as a basis for the simulation are varied during this iteration.

10. The method according to claim 9, in which during said iteration the mask properties to be determined in the characterization of the mask, in particular possible defect positions, remain excluded from a variation.

11. The method according to claim 1, in which before generating a hybrid spectrum on the basis of the first partial spectra and the second partial spectrum in step d) the spectral resolution of the first partial spectra is increased.

12. A device for generating a reference image in the characterization of the mask for microlithography, in which the device is configured to implement a process for generating the reference image, wherein the mask comprises a plurality of structures and wherein the reference image is generated by simulation of the imaging of said mask, said imaging being effected by a given optical system, both using a rigorous electromagnetic simulation and using a Kirchhoff simulation, wherein the process includes:
  a) assigning each structure of said plurality of structures either to a first category or to a second category;
  b) calculating, using one or more data processors, a plurality of first partial spectra for structures of the first category with implementation of rigorous electromagnetic simulations;
  c) calculating, using the one or more data processors, a second partial spectrum for structures of the second category with implementation of a Kirchhoff simulation;
  d) generating, using the one or more data processors, a hybrid spectrum on the basis of the first partial spectra and the second partial spectrum; and
  e) generating, using the one or more data processors, the reference image with implementation of an optical forward propagation of said hybrid spectrum in the optical system.

13. The device of claim 12 in which the structures assigned to the first category in step a) comprise auxiliary structures having a structure size below the resolution limit of the optical system.

14. The device of claim 13 in which the structures assigned to the second category in step a) comprise used structures that are intended for imaging onto a wafer in a microlithographic exposure process.

15. The device of claim 13 in which partial spectra calculated for structures of the first category with implementation of rigorous electromagnetic simulations are retrieved from a database generated beforehand.

16. The device of claim 12 in which the structures assigned to the second category in step a) comprise used structures that are intended for imaging onto a wafer in a microlithographic exposure process.

17. The device of claim 12, comprising a database that stores partial spectra calculated for structures of the first category with implementation of rigorous electromagnetic simulations.

18. The device of claim 12 in which the device is configured to carry out step e) of generating the reference image repeatedly in an iterative process, wherein mask parameters, system parameters of the optical system and/or illumination parameters taken as a basis for the simulation are varied during this iteration.

19. The device of claim 18 in which during said iteration the mask properties to be determined in the characterization of the mask, including possible defect positions, remain excluded from a variation.

20. The device of claim 12 in which before generating a hybrid spectrum on the basis of the first partial spectra and the second partial spectrum in step d) the spectral resolution of the first partial spectra is increased.

* * * * *